US006801136B1

(12) United States Patent
Goodman et al.

(10) Patent No.: US 6,801,136 B1
(45) Date of Patent: Oct. 5, 2004

(54) METHOD OF REDUCING NOISE IN A BOREHOLE ELECTROMAGNETIC TELEMETRY SYSTEM

(75) Inventors: William L. Goodman, Los Altos Hills, CA (US); Mark Sweeny, Belmont, CA (US)

(73) Assignee: Gas Research Institute, Des Plaines, IL (US)

( * ) Notice: Subject to any disclaimer, the term of this patent is extended or adjusted under 35 U.S.C. 154(b) by 379 days.

(21) Appl. No.: 09/677,283

(22) Filed: Oct. 2, 2000

Related U.S. Application Data

(60) Provisional application No. 60/157,358, filed on Oct. 1, 1999.

(51) Int. Cl.[7] .................................................. G01V 3/00

(52) U.S. Cl. ................................ 340/854.3; 340/854.6; 324/244; 324/250; 324/344; 324/345

(58) Field of Search ........................... 340/854.6, 853.2; 324/333, 344, 338, 345, 350, 244, 247, 248

(56) References Cited

U.S. PATENT DOCUMENTS

| | | | | |
|---|---|---|---|---|
| 2,544,569 A | * | 3/1951 | Silverman | 175/50 |
| 4,837,514 A | * | 6/1989 | Spies | 324/336 |
| 4,980,682 A | * | 12/1990 | Klein et al. | 340/854.6 |
| 5,229,765 A | * | 7/1993 | Gardner | 340/853.2 |
| 5,642,045 A | * | 6/1997 | Keefe et al. | 324/244 |
| 5,780,784 A | * | 7/1998 | Robbins | 181/102 |
| 5,901,453 A | * | 5/1999 | Zhang et al. | 33/366.11 |
| 5,912,930 A | | 6/1999 | Iwasaki | |
| 5,959,548 A | * | 9/1999 | Smith | 340/854.8 |
| 6,023,658 A | * | 2/2000 | Jeffryes | 702/16 |
| 6,188,223 B1 | * | 2/2001 | Van Steenwyk et al. | 324/370 |
| 6,204,667 B1 | * | 3/2001 | Won | 324/329 |
| 6,208,265 B1 | * | 3/2001 | Smith | 340/854.6 |
| 6,339,328 B1 | * | 1/2002 | Keene et al. | 324/248 |
| 6,396,276 B1 | * | 5/2002 | Van Steenwyk et al. | 324/366 |

* cited by examiner

*Primary Examiner*—Albert K. Wong
(74) *Attorney, Agent, or Firm*—Mark E. Fejer

(57) ABSTRACT

A method for reducing noise in borehole electromagnetic telemetry systems in which a signal receiver is positioned at a distance from a drill site borehole at which the signal receiver couples strongly to a signal from a signal transmitter disposed in the borehole and weakly to drill site noise emanating from the drill borehole, a noise receiver is positioned at a distance from the drill site borehole at which the noise receiver couples substantially only to magnetotelluric and/or drill site noise, the contributions of the magnetotelluric noise and drill site noise are determined, and subtracted from the signal received by the signal receiver, resulting in a reduced noise signal.

4 Claims, 1 Drawing Sheet

METHOD OF REDUCING NOISE IN A BOREHOLE ELECTROMAGNETIC TELEMETRY SYSTEM

CROSS REFERENCE TO RELATED APPLICATION

This application claims the benefit of provisional U.S. patent application Ser. No. 60/157,358 filed Oct. 1, 1999.

BACKGROUND OF THE INVENTION

1. Field of the Invention

This invention relates to a method and system for reducing noise in an electromagnetic borehole telemetry system.

2. Description of Prior Art

Electromagnetic telemetry systems are used to transmit information from down in an oil or gas well borehole to equipment located on the surface. A typical borehole telemetry system utilizing electromagnetic means includes a low frequency transmitter located down in the borehole and a signal receiver located on the surface. Electric dipole transmission is already being used as a means of telemetry and magnetic dipole transmission is currently under development. Instead of transmitting electromagnetic signals over conductors in the borehole, the telemetry system transmits the signal through the earth formations surrounding the borehole. One problem associated with these telemetry systems is that of poor signal to noise ratio at the extreme limits of range. Ambient noises include telluric noise and manmade noise from power lines and on-site machinery such as pumps and generators. These noise sources can seriously degrade the usefulness of an electromagnetic telemetry system. Thus, it is desirable to reduce the noise in an electromagnetic telemetry system as much as possible.

The use of auxiliary noise receivers in noise cancellation is not a new idea. The most common embodiment is to use one receiver, far from the signal of interest, to detect magnetotelluric noise and another receiver near the signal source. U.S. Pat. No. 4,980,682 teaches a method of reducing noise in a borehole electromagnetic telemetry system in which one receiver is placed near each noise source. Although the basic method of this patent is basically sound, it has several drawbacks which include (1) the need for a large number of receivers and resulting cabling, (2) the need to identify each noise source, and (3) the use of a complex method for determining the coefficients of each receiver which can involve turning drilling equipment on and off. This is because the weights needed for the receivers are treated as unknowns that need to be determined experimentally.

SUMMARY OF THE INVENTION

It is one object oft his invention to provide a method for reducing noise in an electromagnetic borehole telemetry system which overcomes the aforementioned disadvantages.

This and other objects of this invention are addressed by a method for reducing noise in a borehole electromagnetic telemetry system having a signal transmitter disposed in a drill site borehole comprising the steps of positioning at least one signal receiver at a distance from the drill site borehole at which the signal receiver couples strongly to a signal from the signal transmitter and weakly to drill site noise emanating from the drill site borehole and positioning at least one noise receiver at a distance from the drill site borehole at which the noise receiver couples substantially only to magnetotelluric and/or drill site noise. The contribution of the magnetotelluric and/or drill site noise is then determined and subtracted from the signal received by the at least one signal receiver, resulting in a reduced noise signal.

In its simplest form, the method of this invention requires the use of only two receivers disposed on opposite sides of the drill site and oriented to receive a horizontal field component which lies in the line passing through the two receivers and the drill site. The difference in the field at the two receivers is then determined, which difference corresponds to the signal generated by the magnetic signal source. The dipole noise from the drill site does not contribute to this difference and the magnetotelluric noise is canceled while the desired signal is actually increased, as it is the sum from both receivers. Thus, the configuration of this method of the invention reduces both dipole noise from the drill site and magnetotelluric noise using only two receivers.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

This invention is based upon the observation that noise sources within a drill site are often located close enough together to appear at the receiver locations as a single noisy dipole. This is almost always the case for magnetic means, and often is the case for electric dipole telemetry. As a result, a small number of "noise receivers" can be used to achieve significant noise cancellation.

The method of this invention utilizes a plurality of receivers, such as magnetometers, to enable the reduction of environmental noise near a drill site for the purpose of enhancing the signal generated by a signal transmitter of a borehole electromagnetic telemetry system disposed in a drill site borehole. In accordance with one particularly preferred embodiment, as will be discussed hereinbelow, a special configuration is provided which utilizes only two receivers in which noises from both the drill site and magnetotelluric noise are strongly suppressed while the signal is enhanced. In the case where this configuration is not used, a total of more than two receivers will generally be needed to reduce both manmade noise from the drill site and magnetotelluric noise.

In accordance with one embodiment of the method of this invention, one or more receivers are placed at a distance from the drill site corresponding to approximately one-third the depth of the signal transmitter or antenna. The first receiver is located to couple strongly to the transmitted signal and weakly to noise emanating from the drill site. Additional receivers are placed on both sides oft he first receiver, one far from the drill site and another closer to the drill site so as to couple primarily to magnetotelluric noise and noise from the drill site, respectively.

We have conducted a series of long distance transmission measurements for, among other things, the characterization of system noise under realistic conditions, collecting data with weak signals present for testing signal detection algorithms and to demonstrate signal transmission over a range that is close to that to be used in fielded systems.

Figure 1:
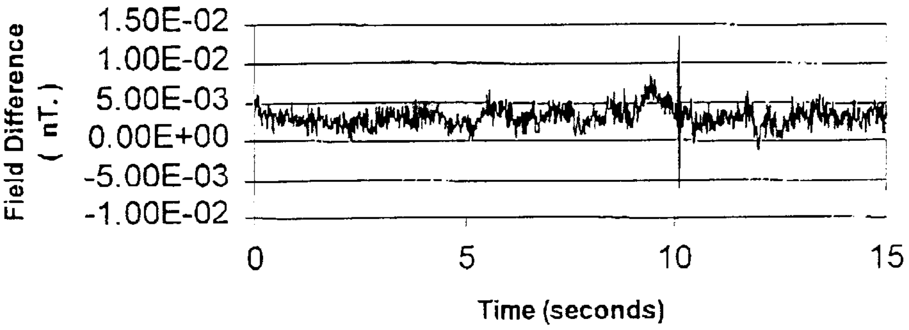
FIG. 1 is a diagram showing "gradient" noise in real time.

The noise was characterized by real time observations and by power spectral density. FIG. 1 shows a real time plot of gradient noise. In this case, gradient noise is the difference between the two receivers or magnetometers. This time segment shows several features indicative of non-gaussian noise. The large spike near 10 seconds is the most obvious. Another is the transition from relative quiet to higher noise near 5 seconds. The last 10 seconds shows several sudden steps which are likely of non-gaussian origin.

Gaussian noise is a model well suited to the case where the total noise is the sum of many small random variables. Non-gaussian noise occurs when single “random” events, such as a lighting strike, give rise to a noticeable feature in the noise. Non-gaussian noise in magnetometer data is well known. Non-gaussian noise events are characterized by a correlation between the signal band and out-of-band parts of the spectrum so that we may be able to identify them and process them out.

Figure 2:
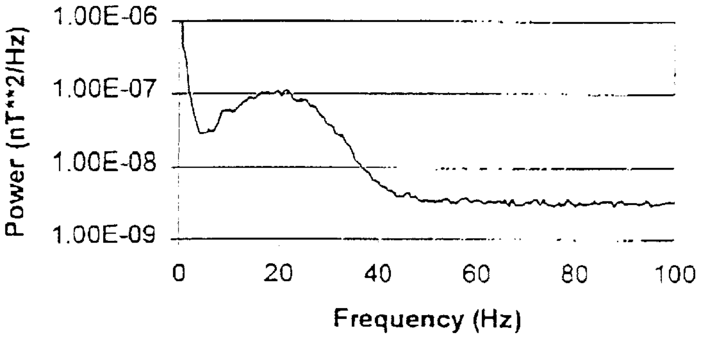
FIG. 2 is a diagram showing the field difference between two receivers.
Figure 3:
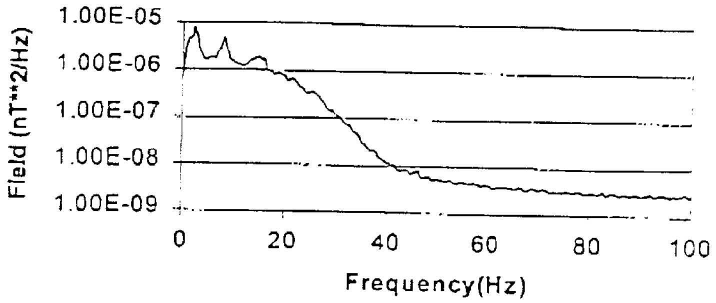
FIG. 3 is a diagram showing the power spectrum of a single receiver.

The noises were measured at all three different orientations of the magnetometers and at least two orientations of the signal transmitter (antenna) for each magnetometer orientation. The differences observed were very small and no greater than the differences observed between measurements carried out at different times. FIGS. 2 and 3 show the power of spectral density of the gradiometer noise and the noise in a single magnetometer channel. It is clear that operation near 5 Hz is ideal and that the 1/f noise presents a problem if operation must be shifted to low frequencies. The 5 Hz minimum in the gradiometer noise is within a factor of two of the ultimate low noise level desired for full distance communication, and it is close to the noise levels of the magnetometers.

A further benefit of the method of this invention is that the receiver coefficients are determined mathematically from geometry, and can be determined without a complex experimental procedure. In some cases, a magnetotelluric noise receiver will also be needed, located far from the site. However, as previously mentioned, there is a special configuration in which only a total of two receivers are needed and both noises from the drill site and from magnetotelluric sources are canceled. In addition, a magnetic noise receiver could be built to contain a gradiometer, so that 8 independent receivers can be deployed in a single piece of equipment. In particular, if super conducting SQUID based magnetometers are used, then a superconducting gradiometer would enable very sensitive measurement of the gradient fields.

As previously stated, in accordance with one embodiment of this invention, only two receivers are required to obtain the desired noise reduction. In accordance with this embodiment, the two receivers are placed on opposite sides of the drill site. In this case, the field difference is the signal from a magnetic antenna beneath the site and the dipole noise from the well site does not contribute to this difference. A special feature of this configuration is that magnetotelluric noise will also be canceled while the desired signal is actually increased as it is the sum from both receivers. This is the only configuration that will reduce both dipole noise from the drill site and magnetotelluric noise using only two receivers.

In accordance with one embodiment, a third receiver is located on the same line as the two receivers and the drill site and oriented along the line, but closer to the drill site. In this case, weights are assigned to the three signals from the receivers so as to reduce both the dipole and quadrapole fields from the drill site. Other orientations of receivers will generally require more than three receivers to reduce both the dipole and the quadrapole fields emanating from the drill site.

In general, the procedure to be used for orienting the receivers and assigning weights to their signals is as follows. The initial step is to locate the receivers so as to couple in a different manner to the signal and to the various noise sources. Usually, this results in placement of the receivers apart from each other, and it can generally be assumed that all three field components are available at each location, that is, for n locations, one will have 3 times n independent receivers. The couplings of each noise source through each receiver are calculated as are the couplings of the signal. The couplings allow expression of the contribution of each noise source to an estimated signal as a linear equation in weights. If the number of receivers exceeds the number of noise sources, then well known methods for the solution of linear equations can be used to calculate the weights, which will result in none of the noise sources contributing to the estimated signal. If the number of receivers exceeds the number of noise sources by more than one, the solution will not be unique. In this case, the solution is picked which minimizes the contribution of noise sources not included in the original set. Usually this means that the contribution of receivers close to the drill site will be small. If the number of receivers is not larger than the number of noise sources, the expected strength of each source must be estimated. In most cases, this estimate is best arrived at with the help of experimental data. With noise intensities in hand, the total expected noise contribution can be expressed by means of an equation which is quadratic in the weights and the minimization of the total noise leads to a set of linear equations in the weights which can be solved as before. Each location need not contain a 3-axis receiver, but instead, a single receiver oriented in the direction corresponding to the weights of the three receivers originally may be assumed. Trying out various sets of locations and choosing the one that minimizes the expected noise can further optimize the system.

Thus, the system for carrying out the method of this invention comprises a transmitter driving a magnetic or electric dipole antenna and a receiver system, which receiver system comprises a plurality of individual receivers with the signals of the receivers being given various weights and added together to form an estimate of the transmitted signal. The locations, orientations and weights of the various receivers is determined by the following three steps: (1) make simplifying assumptions regarding the noise and signal sources so that the noise can be regarded as a superposition of a small number of independent noise sources, each of which couples to each receiver with a strength that can be estimated mathematically, (2) arrange and orient the receivers so that some noise components do not couple to any receiver, if possible, and (3) assign the weights so that the remaining noise sources do not contribute, or contribute in a minimal way, to the estimated signal.

In accordance with one embodiment of the method of this invention, three receivers are placed along a line that passes through a drill site with the receiver as being oriented in the direction of the line. Two of the receivers are disposed at a distance from the drill site chosen so that the received signal strength will be a large fraction (80%–90%) of its maximum. This distance will correspond to about ¼ to ⅓ the depth of the antenna in the borehole. The third receiver is disposed closer to the drill rig so as to couple strongly to the quadrapole field from the drill site. The signals from the receivers are combined so as to reduce both quadrapole and dipole fields from the drill site.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In a borehole electromagnetic telemetry system comprising a signal transmitter disposed in a drill site borehole, a method for reducing noise in said borehole electromagnetic telemetry system comprising the steps of:

positioning at least one signal receiver at a distance from said drill site borehole at which said at least one signal receiver couples strongly to a signal from said signal transmitter and weakly to drill site noise produced by a plurality of drill site noise sources and emanating from said drill site borehole;

positioning at least one first noise receiver at a distance from said drill site borehole at which said first noise receiver couples substantially only to magnetotelluric noise;

positioning at least one second noise receiver at a distance from said drill site borehole at which said second noise receiver couples substantially only to said drill site noise;

determining a contribution of at least one of said magnetotelluric noise and said drill site noise; and removing said contribution of at least one of said magnetotelluric noise and said drill site noise from said signal received by said at least one signal receiver, resulting in a reduced noise signal.

2. A method in accordance with claim 1, wherein said at least one signal receiver is disposed at a distance from said drill site borehole corresponding to about ⅓ of a depth of said signal transmitter.

3. A method in accordance with claim 1, wherein said at least one signal receiver and at least one of said noise receivers are gradiometers.

4. A method in accordance with claim 2, wherein said first noise receiver is disposed further from said drill site borehole than said at least one signal receiver and said second noise receiver is disposed closer to said drill site borehole than said at least one signal receiver.

* * * * *